(12) United States Patent
Westerman

(10) Patent No.: US 7,920,131 B2
(45) Date of Patent: Apr. 5, 2011

(54) KEYSTROKE TACTILITY ARRANGEMENT ON A SMOOTH TOUCH SURFACE

(75) Inventor: Wayne Carl Westerman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/550,280

(22) Filed: Aug. 28, 2009

(65) Prior Publication Data

US 2009/0315830 A1 Dec. 24, 2009

Related U.S. Application Data

(62) Division of application No. 11/380,109, filed on Apr. 25, 2006.

(51) Int. Cl.
*G06F 3/041* (2006.01)
(52) U.S. Cl. ........................ 345/173; 345/168
(58) Field of Classification Search .................. None
See application file for complete search history.

(56) References Cited

U.S. PATENT DOCUMENTS

| | | |
|---|---|---|
| 3,333,160 A | 7/1967 | Gorski |
| 3,541,541 A | 11/1970 | Englebart |
| 3,662,105 A | 5/1972 | Hurst et al. |
| 3,798,370 A | 3/1974 | Hurst |
| 3,995,126 A | 11/1976 | Larson |
| 4,127,752 A | 11/1978 | Lowthorp |
| 4,194,097 A | 3/1980 | Bradam |
| 4,246,452 A | 1/1981 | Chandler |
| 4,508,942 A | 4/1985 | Inaba et al. |
| 4,550,221 A | 10/1985 | Mabusth |
| 4,672,364 A | 6/1987 | Lucas |
| 4,672,558 A | 6/1987 | Beckes et al. |
| 4,692,809 A | 9/1987 | Beining et al. |
| 4,695,827 A | 9/1987 | Beining et al. |
| 4,707,570 A | 11/1987 | Ide et al. |

(Continued)

FOREIGN PATENT DOCUMENTS

CA 1243096 10/1988

(Continued)

OTHER PUBLICATIONS

Anonymous. "Surface Acoustic Wave Touchscreens" obtained from http://www.touchscreens.com/intro-touchtypes-saw.html generated Aug. 5, 2005.

(Continued)

*Primary Examiner* — Alexander Eisen
*Assistant Examiner* — Matthew Yeung
(74) *Attorney, Agent, or Firm* — Morrison & Foerster LLP

(57) ABSTRACT

Disclosed are four arrangements for providing tactility on a touch surface keyboard. One approach is to provide tactile feedback mechanisms, such as dots, bars, or other shapes on all or many keys. In another embodiment, an articulating frame may be provided that extends when the surface is being used in a typing mode and retracts when the surface is used in some other mode, e.g., a pointing mode. The articulating frame may provide key edge ridges that define the boundaries of the key regions or may provide tactile feedback mechanisms within the key regions. The articulating frame may also be configured to cause concave depressions similar to mechanical key caps in the surface. In another embodiment, a rigid, non-articulating frame may be provided beneath the surface. A user will then feel higher resistance when pressing away from the key centers, but will feel a softer resistance at the key center.

17 Claims, 4 Drawing Sheets

U.S. PATENT DOCUMENTS

| | | | |
|---|---|---|---|
| 4,733,222 A | 3/1988 | Evans | |
| 4,734,685 A | 3/1988 | Watanabe | |
| 4,746,770 A | 5/1988 | McAvinney | |
| 4,771,276 A | 9/1988 | Parks | |
| 4,788,384 A | 11/1988 | Bruere-Dawson et al. | |
| 4,806,846 A | 2/1989 | Kerber | |
| 4,898,555 A | 2/1990 | Sampson | |
| 4,940,346 A | 7/1990 | Liljenquist | |
| 4,968,877 A | 11/1990 | McAvinney et al. | |
| 4,990,900 A | 2/1991 | Kikuchi et al. | |
| 5,003,519 A | 3/1991 | Noirjean | |
| 5,017,030 A | 5/1991 | Crews | |
| 5,178,477 A | 1/1993 | Gambaro | |
| 5,189,403 A | 2/1993 | Franz et al. | |
| 5,194,862 A | 3/1993 | Edwards | |
| 5,224,861 A | 7/1993 | Glass et al. | |
| 5,241,308 A | 8/1993 | Young | |
| 5,252,951 A | 10/1993 | Tannenbaum et al. | |
| 5,281,966 A | 1/1994 | Walsh | |
| 5,305,017 A | 4/1994 | Gerpheide | |
| 5,311,175 A | 5/1994 | Waldman | |
| 5,345,543 A | 9/1994 | Capps et al. | |
| 5,376,948 A | 12/1994 | Roberts | |
| 5,379,057 A | 1/1995 | Clough et al. | |
| 5,398,310 A | 3/1995 | Tchao et al. | |
| 5,412,189 A | 5/1995 | Cragun | |
| 5,442,742 A | 8/1995 | Greyson et al. | |
| 5,463,388 A | 10/1995 | Boie et al. | |
| 5,463,696 A | 10/1995 | Beernink et al. | |
| 5,466,154 A * | 11/1995 | Thompson | 434/114 |
| 5,483,261 A | 1/1996 | Yasutake | |
| 5,488,204 A | 1/1996 | Mead et al. | |
| 5,495,077 A | 2/1996 | Miller et al. | |
| 5,513,309 A | 4/1996 | Meier et al. | |
| 5,523,775 A | 6/1996 | Capps | |
| 5,530,455 A | 6/1996 | Gillick et al. | |
| 5,543,590 A | 8/1996 | Gillespie et al. | |
| 5,543,591 A | 8/1996 | Gillespie et al. | |
| 5,563,632 A | 10/1996 | Roberts | |
| 5,563,996 A | 10/1996 | Tchao | |
| 5,565,658 A | 10/1996 | Gerpheide et al. | |
| 5,579,036 A | 11/1996 | Yates, IV | |
| 5,580,251 A * | 12/1996 | Gilkes et al. | 434/113 |
| 5,581,681 A | 12/1996 | Tchao et al. | |
| 5,583,946 A | 12/1996 | Gourdol | |
| 5,590,219 A | 12/1996 | Gourdol | |
| 5,592,566 A | 1/1997 | Pagallo et al. | |
| 5,594,810 A | 1/1997 | Gourdol | |
| 5,596,694 A | 1/1997 | Capps | |
| 5,612,719 A | 3/1997 | Beernink et al. | |
| 5,631,805 A | 5/1997 | Bonsall | |
| 5,633,955 A | 5/1997 | Bozinovic et al. | |
| 5,634,102 A | 5/1997 | Capps | |
| 5,635,958 A | 6/1997 | Murai et al. | |
| 5,636,101 A | 6/1997 | Bonsall et al. | |
| 5,642,108 A | 6/1997 | Gopher et al. | |
| 5,644,657 A | 7/1997 | Capps et al. | |
| 5,666,113 A | 9/1997 | Logan | |
| 5,666,502 A | 9/1997 | Capps | |
| 5,666,552 A | 9/1997 | Greyson et al. | |
| 5,675,361 A | 10/1997 | Santilli | |
| 5,675,362 A | 10/1997 | Clough et al. | |
| 5,677,710 A | 10/1997 | Thompson-Rohrlich | |
| 5,689,253 A | 11/1997 | Hargreaves et al. | |
| 5,710,844 A | 1/1998 | Capps et al. | |
| 5,729,250 A | 3/1998 | Bishop et al. | |
| 5,730,165 A | 3/1998 | Philipp | |
| 5,736,976 A | 4/1998 | Cheung | |
| 5,741,990 A | 4/1998 | Davies | |
| 5,745,116 A | 4/1998 | Pisutha-Arnond | |
| 5,745,716 A | 4/1998 | Tchao et al. | |
| 5,748,269 A | 5/1998 | Harris et al. | |
| 5,764,222 A | 6/1998 | Shieh | |
| 5,764,818 A | 6/1998 | Capps et al. | |
| 5,766,014 A * | 6/1998 | Ida et al. | 434/114 |
| 5,767,457 A | 6/1998 | Gerpheide et al. | |
| 5,767,842 A | 6/1998 | Korth | |
| 5,790,104 A | 8/1998 | Shieh | |
| 5,790,107 A | 8/1998 | Kasser et al. | |
| 5,802,516 A | 9/1998 | Shwarts et al. | |
| 5,808,567 A | 9/1998 | McCloud | |
| 5,809,267 A | 9/1998 | Moran et al. | |
| 5,821,690 A | 10/1998 | Martens et al. | |
| 5,821,930 A | 10/1998 | Hansen | |
| 5,823,782 A | 10/1998 | Marcus et al. | |
| 5,825,351 A | 10/1998 | Tam | |
| 5,825,352 A | 10/1998 | Bisset et al. | |
| 5,835,079 A | 11/1998 | Shieh | |
| 5,835,080 A | 11/1998 | Beeteson et al. | |
| 5,854,625 A | 12/1998 | Frisch et al. | |
| 5,880,411 A | 3/1999 | Gillespie et al. | |
| 5,898,434 A | 4/1999 | Small et al. | |
| 5,917,906 A | 6/1999 | Thornton | |
| 5,920,309 A | 7/1999 | Bisset et al. | |
| 5,923,319 A | 7/1999 | Bishop et al. | |
| 5,933,134 A | 8/1999 | Shieh | |
| 5,943,044 A | 8/1999 | Martinelli et al. | |
| 5,955,198 A | 9/1999 | Hashimoto et al. | |
| 6,002,389 A | 12/1999 | Kasser | |
| 6,002,808 A | 12/1999 | Freeman | |
| 6,020,881 A | 2/2000 | Naughton et al. | |
| 6,031,524 A | 2/2000 | Kunert | |
| 6,037,882 A | 3/2000 | Levy | |
| 6,050,825 A | 4/2000 | Nichol et al. | |
| 6,052,339 A | 4/2000 | Frenkel et al. | |
| 6,072,494 A | 6/2000 | Nguyen | |
| 6,084,576 A | 7/2000 | Leu et al. | |
| 6,107,997 A | 8/2000 | Ure | |
| 6,128,003 A | 10/2000 | Smith et al. | |
| 6,131,299 A | 10/2000 | Raab et al. | |
| 6,135,958 A | 10/2000 | Mikula-Curtis et al. | |
| 6,144,380 A | 11/2000 | Shwarts et al. | |
| 6,188,391 B1 | 2/2001 | Seely et al. | |
| 6,198,515 B1 | 3/2001 | Cole | |
| 6,208,329 B1 | 3/2001 | Ballare | |
| 6,222,465 B1 | 4/2001 | Kumar et al. | |
| 6,239,790 B1 | 5/2001 | Martinelli et al. | |
| 6,243,071 B1 | 6/2001 | Shwarts et al. | |
| 6,246,862 B1 | 6/2001 | Grivas et al. | |
| 6,249,606 B1 | 6/2001 | Kiraly et al. | |
| 6,288,707 B1 | 9/2001 | Philipp | |
| 6,289,326 B1 | 9/2001 | LaFleur | |
| 6,292,178 B1 | 9/2001 | Bernstein et al. | |
| 6,310,610 B1 | 10/2001 | Beaton et al. | |
| 6,323,846 B1 | 11/2001 | Westerman et al. | |
| 6,347,290 B1 | 2/2002 | Bartlett | |
| 6,356,259 B1 | 3/2002 | Maeda et al. | |
| 6,377,009 B1 | 4/2002 | Philipp | |
| 6,380,931 B1 | 4/2002 | Gillespie et al. | |
| 6,411,287 B1 | 6/2002 | Scharff et al. | |
| 6,414,671 B1 | 7/2002 | Gillespie et al. | |
| 6,421,234 B1 | 7/2002 | Ricks et al. | |
| 6,429,846 B2 | 8/2002 | Rosenberg et al. | |
| 6,452,514 B1 | 9/2002 | Philipp | |
| 6,457,355 B1 | 10/2002 | Philipp | |
| 6,466,036 B1 | 10/2002 | Philipp | |
| 6,515,669 B1 | 2/2003 | Mohri | |
| 6,525,749 B1 | 2/2003 | Moran et al. | |
| 6,535,200 B2 | 3/2003 | Philipp | |
| 6,543,684 B1 | 4/2003 | White et al. | |
| 6,543,947 B2 | 4/2003 | Lee | |
| 6,570,557 B1 | 5/2003 | Westerman et al. | |
| 6,593,916 B1 | 7/2003 | Aroyan | |
| 6,610,936 B2 | 8/2003 | Gillespie et al. | |
| 6,624,833 B1 | 9/2003 | Kumar et al. | |
| 6,636,202 B2 * | 10/2003 | Ishmael et al. | 345/173 |
| 6,639,577 B2 | 10/2003 | Eberhard | |
| 6,650,319 B1 | 11/2003 | Hurst et al. | |
| 6,658,994 B1 | 12/2003 | McMillan | |
| 6,667,738 B2 * | 12/2003 | Murphy | 345/173 |
| 6,670,894 B2 | 12/2003 | Mehring | |
| 6,677,932 B1 | 1/2004 | Westerman | |
| 6,677,934 B1 | 1/2004 | Blanchard | |
| 6,690,387 B2 | 2/2004 | Zimmerman et al. | |
| 6,706,552 B2 | 3/2004 | Getz et al. | |
| 6,724,366 B2 | 4/2004 | Crawford | |
| 6,757,002 B1 | 6/2004 | Oross et al. | |

| | | |
|---|---|---|
| 6,803,906 B1 | 10/2004 | Morrison et al. |
| 6,842,672 B1 | 1/2005 | Straub et al. |
| 6,856,259 B1 | 2/2005 | Sharp |
| 6,888,536 B2 | 5/2005 | Westerman et al. |
| 6,900,795 B1 | 5/2005 | Knight, III et al. |
| 6,927,761 B2 | 8/2005 | Badaye et al. |
| 6,942,571 B1 | 9/2005 | McAllister et al. |
| 6,965,375 B1 | 11/2005 | Gettemy et al. |
| 6,972,401 B2 | 12/2005 | Akitt et al. |
| 6,977,666 B1 | 12/2005 | Hedrick |
| 6,985,801 B1 | 1/2006 | Straub et al. |
| 6,992,659 B2 | 1/2006 | Gettemy |
| 7,015,894 B2 | 3/2006 | Morohoshi |
| 7,031,228 B2 | 4/2006 | Born et al. |
| 7,148,875 B2 | 12/2006 | Rosenberg et al. |
| 7,184,064 B2 | 2/2007 | Zimmerman et al. |
| 7,219,829 B2 | 5/2007 | Treat |
| RE40,153 E | 3/2008 | Westerman et al. |
| 7,339,572 B2 | 3/2008 | Schena |
| 7,663,607 B2 | 2/2010 | Hotelling et al. |
| 2002/0118848 A1 | 8/2002 | Karpenstein |
| 2002/0149570 A1 | 10/2002 | Knowles et al. |
| 2003/0006974 A1 | 1/2003 | Clough et al. |
| 2003/0076301 A1 | 4/2003 | Tsuk et al. |
| 2003/0076303 A1 | 4/2003 | Huppi |
| 2003/0076306 A1 | 4/2003 | Zadesky et al. |
| 2003/0095095 A1 | 5/2003 | Pihlaja |
| 2003/0095096 A1 | 5/2003 | Robbin et al. |
| 2003/0098858 A1 | 5/2003 | Perski et al. |
| 2003/0151597 A1* | 8/2003 | Roberts et al. ............ 345/173 |
| 2003/0206202 A1 | 11/2003 | Moriya |
| 2003/0234768 A1 | 12/2003 | Rekimoto et al. |
| 2004/0229663 A1 | 11/2004 | Tosey et al. |
| 2004/0263481 A1 | 12/2004 | Nishikawa et al. |
| 2004/0263484 A1 | 12/2004 | Mantysalo et al. |
| 2005/0012723 A1 | 1/2005 | Pallakoff |
| 2005/0030292 A1* | 2/2005 | Diederiks ............ 345/173 |
| 2005/0052425 A1 | 3/2005 | Zadesky et al. |
| 2005/0104867 A1 | 5/2005 | Westerman et al. |
| 2005/0110768 A1 | 5/2005 | Marriott et al. |
| 2005/0285846 A1 | 12/2005 | Funaki |
| 2006/0022955 A1 | 2/2006 | Kennedy |
| 2006/0022956 A1 | 2/2006 | Lengeling et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0032680 A1 | 2/2006 | Elias et al. |
| 2006/0033724 A1 | 2/2006 | Chaudhri et al. |
| 2006/0044259 A1 | 3/2006 | Hotelling et al. |
| 2006/0053387 A1 | 3/2006 | Ording |
| 2006/0066582 A1 | 3/2006 | Lyon et al. |
| 2006/0085757 A1 | 4/2006 | Andre et al. |
| 2006/0097991 A1 | 5/2006 | Hotelling et al. |
| 2006/0197753 A1 | 9/2006 | Hotelling |
| 2006/0232567 A1 | 10/2006 | Westerman et al. |
| 2006/0238517 A1 | 10/2006 | King et al. |
| 2006/0238518 A1 | 10/2006 | Westerman et al. |
| 2006/0238519 A1 | 10/2006 | Westerman et al. |
| 2006/0238520 A1 | 10/2006 | Westerman et al. |
| 2006/0238521 A1 | 10/2006 | Westerman et al. |
| 2006/0238522 A1 | 10/2006 | Westerman et al. |
| 2007/0229464 A1 | 10/2007 | Hotelling et al. |
| 2007/0236466 A1 | 10/2007 | Hotelling |
| 2007/0247429 A1 | 10/2007 | Westerman |
| 2007/0257890 A1 | 11/2007 | Hotelling et al. |
| 2008/0297476 A1 | 12/2008 | Hotelling et al. |

FOREIGN PATENT DOCUMENTS

| | | |
|---|---|---|
| DE | 102 51 296 | 5/2004 |
| DE | 103 24 580 | 12/2004 |
| EP | 0 288 692 | 11/1988 |
| EP | 0 464 908 | 1/1992 |
| EP | 0 664 504 | 7/1995 |
| EP | 0 915 490 | 5/1999 |
| EP | 1 014 295 | 6/2000 |
| GB | 2009047 | 6/1979 |
| JP | 2000-163031 A | 6/2000 |
| JP | 2002-342033 A | 11/2002 |
| WO | WO-97/018547 | 5/1997 |
| WO | WO-97/023738 | 7/1997 |
| WO | WO-98/14863 | 4/1998 |
| WO | WO-99/38149 | 7/1999 |
| WO | WO-03/088176 | 10/2003 |
| WO | WO-2004/109488 | 12/2004 |
| WO | WO-2006/023569 | 3/2006 |
| WO | WO-2007/127585 A2 | 11/2007 |
| WO | WO-2007/127585 A3 | 11/2007 |
| WO | WO-2007/128585 A2 | 11/2007 |
| WO | WO-2007/128585 A3 | 11/2007 |

OTHER PUBLICATIONS

Anonymous.. "Touch Technologies Overview" 2001, 3M Touch Systems, Massachusetts.

Anonymous. "4-Wire Resistive Touchscreens" obtained from http://www.touchscreens.com/intro-touchtypes-4resistive.html generated Aug. 5, 2005.

Anonymous. "5-Wire Resistive Touchscreens" obtained from http://www.touchscreens.com/intro-touchtypes-resistive.html generated Aug. 5, 2005.

Anonymous. "A Brief Overview of Gesture Recognition" obtained from http://www. Dai. Ed. Ac.uk/Cvonline/LOCA_COPIES/COHEN/gesture_overview. Html, generated Apr. 20, 2004.

Anonymous. "Capacitive Position Sensing" obtained from http://www.synaptics.com/technology/cps.cfin generated Aug. 5, 2005.

Anonymous. "Capacitive Touchscreens" obtained from http://www.touchscreens.com/intro-touchtypes-capacitive.html generated Aug. 5, 2005.

Anonymous. "Comparing Touch Technologies" obtained from http://www.touchscreens.com/intro-touchtypes.html generated Oct. 10, 2004.

Anonymous. "FingerWorks—Gesture Guide—Application Switching," obtained from http://www.fingerworks.com/gesture_guide_apps.html, generated on Aug. 27, 2004, 1-pg.

Anonymous. "FingerWorks—Gesture Guide—Editing," obtained from http://www.fingerworks.com/gesure_guide_editing.html, generated on Aug. 27, 2004, 1-pg.

Anonymous. "FingerWorks—Gesture Guide—File Operations," obtained from http://www.fingerworks.com/gesture_guide_files.html, generated on Aug. 27, 2004, 1-pg.

Anonymous. "FingerWorks—Gesture Guide—Text Manipulation," obtained from http://www.fingerworks.com/gesture_guide_text_manip.html, generated on Aug. 27, 2004, 2-pg.

Anonymous. "FingerWorks—Gesture Guide—Tips and Tricks," obtained from http://www.fingerworks.com/gesture_guide_tips.html, generated Aug. 27, 2004, 2-pgs.

Anonymous. "FingerWorks—Gesture Guide—Web," obtained from http://www.fingerworks.com/gesture_guide_web.html, generated on Aug. 27, 2004, 1-pg.

Anonymous. "FingerWorks—Guide to Hand Gestures for USB Touchpads," obtained from http://www.fingerworks.com/igesture_userguide.html, generated Aug. 27, 2004, 1-pg.

Anonymous. "FingerWorks—iGesture—Technical Details," obtained from http://www.fingerworks.com/igesture_tech.html, generated Aug. 27, 2004, 1-pg.

Anonymous. "FingerWorks—The Only Touchpads with Ergonomic Full-Hand Resting and Relaxation!" obtained from http://www.fingerworks.com/resting.html, Copyright 2001, 1-pg.

Anonymous. "FingerWorks—Tips for Typing on the Mini," obtained from http://www.fingerworks.com/mini_typing.html, generated on Aug. 27, 2004, 2-pgs.

Anonymous. "GlidePoint®" obtained from http://www.cirque.com/technology/technology_gp.html generated Aug. 5, 2005.

Anonymous. "Gesture Recognition" http://www.fingerworks.com/gesture_recognition.html>, Jul. 2, 2006.

Anonymous. "How do touchscreen monitors know where you're touching?" obtained from http://www.electronics.howstuffworks.com/question716.html generated Aug. 5, 2005.

Anonymous. "How does a touchscreen work?" obtained from http://www.touchscreens.com/intro-anatomy.html generated Aug. 5, 2005.

Anonymous. "iGesture Pad—the MultiFinger USB TouchPad with Whole-Hand Gestures,"obtained from http://www.fingerworks.com/igesture.html, generated Aug. 27, 2004, 2-pgs.

Anonymous. "iGesture Products for Everyone (learn in minutes) Product Overview"FingerWorks.com downloaded Aug. 30, 2005.
Anonymous. "Infrared Touchscreens" obtained from http://www.touchscreens.com/intro-touchtypes-infrared.html generated Aug. 5, 2005.
Anonymous. "Mouse Emulation" FingerWorks obtained from http://www.fingerworks.com/gesture_guide_mouse.html generated Aug. 30, 2005.
Anonymous. "Mouse Gestures in Opera" obtained from http://www.opera.com/products/desktop/mouse/index.dml generated Aug. 30, 2005.
Anonymous. "Mouse Gestures," Optim oz, May 21, 2004.
Anonymous. "MultiTouch Overview" FingerWorks obtained from http://www.fingerworks.com/multoverview.html generated Aug. 30, 2005.
Anonymous. "Near Field Imaging Touchscreens" obtained from http://www.touchscreens.com/intro-touchtypes-nfi.html generated Aug. 5, 2005.
Anonymous. "PenTouch Capacitive Touchscreens" obtained from http://www.touchscreens.com/intro-touchtypes-pentouch.html generated Aug. 5, 2005.
Anonymous. "Symbol Commander" obtained from http://www.sensiva.com/symbolcommander/, generated Aug. 30, 2005.
Anonymous. "Tips for Typing" FingerWorks http://www.fingerworks.com/mini_typing.html generated Aug. 30, 2005.
Anonymous. "Wacom Components—Technology" obtained from http://www.wacom-components.com/english/tech.asp generated on Oct. 10, 2004.
Anonymous. "Watershed Algorithm" http://rsb.info.nih.gov/ij/plugins/watershed.html generated Aug. 5, 2005.
Bier et al., "Toolglass and Magic Lenses: The see-through interface" In James Kijiya, editor, Computer Graphics (SIGGRAPH '93 Proceedings), vol. 27, pp. 73-80, Aug. 1993.
Douglas et al., *The Ergonomics of Computer Pointing Devices* (1997).
European Search Report received in EP 1 621 989 (@ *Beyer Weaver & Thomas, LLP*) dated Mar. 27, 2006.
EVB Elektronik "TSOP6238 IR Receiver Modules for Infrared Remote Control Systems" dated Jan. 2004 1-pg.
Fisher et al., "Repetitive Motion Disorders: The Design of Optimal Rate- Rest Profiles," Human Factors, 35(2):283-304 (Jun. 1993).
Fukumoto and Yoshinobu Tonomura, "Body Coupled Fingering: Wireless Wearable Keyboard," CHI97, pp. 147-154 (Mar. 1997).
Fukumoto et al., "ActiveClick: Tactile Feedback for Touch Panels," In CHI 2001 Summary, pp. 121-122, 2001.
Hardy, "Fingerworks" Mar. 7, 2002; BBC World On Line.
Hillier and Gerald J. Lieberman, *Introduction to Operations Research* (1986).
International Search Report dated Mar. 3, 2006 (PCT/US 05/03325; 119-0052WO).
International Search Report received in corresponding PCT application No. PCT/US2006/008349 dated Oct. 6, 2006.
International Search Report mailed Jan. 2, 2008, for PCT Application No. PCT/US2007/066022, filed Apr. 5, 2007, three pages.
Jacob et al., "Integrality and Separability of Input Devices," *ACM Transactions on Computer-Human Interaction*, 1:3-26 (Mar. 1994).
Kinkley et al., "Touch-Sensing Input Devices," in CHI '99 Proceedings, pp. 223-230, 1999.
Kionx "KXP84 Series Summary Data Sheet" copyright 2005,dated Oct. 21, 2005, 4-pgs.
Lee, "A Fast Multiple-Touch-Sensitive Input Device," Master's Thesis, University of Toronto (1984).
Lee, S.K. et al., "A Multi-Touch Three Dimensional Touch-Sensitive Tablet," in CHI '85 Proceedings, pp. 121-128, 2000 [(Apr. 1985). Conference Proceedings: Human Factors in Computing Systems, pp. 21-25.].
Matsushita et al., "HoloWall: Designing a Finger, Hand, Body and Object Sensitive Wall," In Proceedings of UIST '97, Oct. 1997.
Quantum Research Group "QT510 / Qwheel™ Touch Slider IC" copyright 2004-2005, 14-pgs.
Quek, "Unencumbered Gestural Interaction," *IEEE Multimedia*, 3:36-47 (Winter 1996).
Radwin, "Activation Force and Travel Effects on Overexertion in Repetitive Key Tapping," *Human Factors*, 39(1):130-140 (Mar. 1997).
Rekimoto et al., "ToolStone: Effective Use of the Physical Manipulation Vocabularies of Input Devices," In Proc. Of UIST 2000, 2000.
Rekimoto, J. (2002). "SmartSkin: An Infrastructure for Freehand Manipulation on Interactive Surfaces," *CHI 2002*, Apr. 20-25, 2002. [(Apr. 25, 2002). 4(1):113-120.].
Rubine et al., "Programmable Finger-Tracking Instrument Controllers," *Computer Music Journal*, vol. 14, No. 1 (Spring 1990).
Rutledge et al., "Force-To-Motion Functions For Pointing," Human-Computer Interaction—Interact (1990).
Subatai Ahmad, "A Usable Real-Time 3D Hand Tracker," Proceedings of the 28th Asilomar Conference on Signals, Systems and Computers—Part 2 (of2), vol. 2 (Oct. 1994).
Texas Instruments "TSC2003 / I2C Touch Screen Controller" Data Sheet SBAS 162, dated Oct. 2001, 20-pgs.
U.S. Appl. No. 10/789,676, filed Feb. 27, 2004 entitled "Shape Detecting Input Device".
Wellner, "The Digital Desk Calculators: Tangible Manipulation on a Desk Top Display" In ACM UIST '91 Proceedings, pp. 27-34, Nov. 1991.
Williams, "Applications for a Switched-Capacitor Instrumentation Building Block" Linear Technology Application Note 3, Jul. 1985, pp. 1-16.
Yamada et al., "A Switched-Capacitor Interface for Capacitive Pressure Sensors" IEEE Transactions on Instrumentation and Measurement, vol. 41, No. 1, Feb. 1992, pp. 81-86.
Yeh et al., "Switched Capacitor Interface Circuit for Capacitive Transducers" 1985 IEEE.
Zhai et al., "Dual Stream Input for Pointing and Scrolling," *Proceedings of CHI '97 Extended Abstracts* (1997).
Zimmerman et al., "Applying Electric Field Sensing to Human-Computer Interfaces," In CHI '85 Proceedings, pp. 280-287, 1995.
Final Office Action mailed Nov. 12, 2009, for US Application No. 11/380,109, filed Apr. 25, 2006, nine pp.
Final Office Action mailed Aug. 13, 2010, for US Application No. 11/380,109, filed Apr. 25, 2006, 12 pp.
Non-Final Office Action mailed May 28, 2009, for U.S. Application No. 11/380,109, filed Apr. 25, 2006, 11 pp.
Non-Final Office Action mailed Mar. 4, 2010, for U.S. Appl. No. 11/380,109, filed Apr. 25, 2006, 10 pages.
Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

KEYSTROKE TACTILITY ARRANGEMENT ON A SMOOTH TOUCH SURFACE

CROSS-REFERENCE TO RELATED APPLICATIONS

This application is a division of U.S. patent application Ser. No. 11/380,109, filed Apr. 25, 2006, which is related to the following patents and patent applications, which are all herein incorporated by reference: (1) U.S. Pat. No. 6,323,846, titled "Method and Apparatus for Integrating Manual Input," issued on Jul. 1, 2002; (2) U.S. Pat. No. 6,677,932, titled "System and Method for Recognizing Touch Typing Under Limited Tactile Feedback Conditions," issued on Jan. 13, 2004; and (3) U.S. Pat. No. 6,570,557, titled "Multi-Touch System and Method for Emulating Modifier Keys Via Fingertip Chords," issued on May 27, 2003.

BACKGROUND

Integration of typing, pointing, and gesture capabilities into touch surfaces offers many advantages, such as eliminating need for mouse as a separate pointing device, eliminating wasteful reaches between keyboard and pointing device, and general workflow streamlining. However, pointing and typing have opposite tactile feedback needs. Specifically, pointing and gesturing inputs are best accomplished using a smooth, nearly frictionless touch surface. Conversely, typists are accustomed to relying on sharp key edges for tactile feedback.

User acceptance of the TouchStream™ integrated typing, pointing and gesture input devices manufactured by FingerWorks demonstrated that learning to type on a smooth, untextured surface is possible, but takes substantial practice. In many ways, typing on such a surface is almost like learning to type all over again. It is believed that mainstream acceptance of typing on touch surfaces will require shortening of the typing re-acclimation period, which, in turn, requires improved keystroke tactility.

Traditionally, keystroke tactility on a surface or "membrane" keyboard has been provided by indicating key edges using hydroformed or stamped raised ridges into the surface plastic. However, this technique has several disadvantages for touch surfaces also intended for pointing and gesture. For example, the key-edge ridges impede lateral pointing motions, giving the surface a rough washboard feel. The ridges also disrupt position interpolation from capacitive sensor arrays as the fingertip flesh lifts over the ridge.

In a more successful attempt to provide surface keyboard users with suitable tactile feedback, keyboards incorporating home row dimples as disclosed in U.S. Pat. No. 6,323,846, referenced above, were produced. These dimples helped users find the home row keys when hands were resting on the surface, while minimizing disruption of a user's motion in pointing or gesturing on the surface. However, these dimples were ineffective feedback for helping users feel for keys away from home row, or detect when they were not striking the centers of these peripheral keys.

Another somewhat successful prior method for aligning hands on both surface and traditional mechanical keyboards has been to place a single raised Braille-like dot on an "alignment" key or on the "home row" of keys. For example, many mechanical keyboards features such raised dots on the "F" and "J" keys, which are the index finger home positions for a touch typist using QWERTY keyboard. As with the dimples disclosed in the '846 patent, this arrangement is useful to help align a user's hands to home row, but does not help to correct alignment errors while reaching for peripheral keys. Thus, a significant problem arises in attempting to provide feedback of key positions away from the home row.

Placing alignment dots, such as the single Braille-like dot, at the center of every key would provide feedback for key positions away from the home row. However, such an arrangement would eliminate the distinctiveness of the home row keys, and create more ambiguous feedback for the user. Therefore, what is needed in the art is a way to provide tactility to all or at least a substantial number of keys without creating such a bumpy surface that pointing and gestures are uncomfortable or unsteady.

This could be accomplished by adapting known prior art Braille displays. In this approach, tiny, individually actuated pins spread across the keyboard could provide dynamic tactility, but at great mechanical cost and complexity. Thus, what is needed to reduce cost and complexity is a way to provide tactility for each key without placing individual electromagnetic actuators under each key.

An additional issue arises in that multi-touch capacitive sensor arrays, which are often used to form the multi-touch surfaces, are typically built with row and column electrodes spanning the surface, or with row and column drive/sense line accessing electronic buffers at each electrode cell. Thus whatever tactility mechanism is provided, the arrangement must be routable around the row/column electrodes or drive lines of multi-touch sensors without requiring additional circuit board vias or layers.

Disclosed herein are a variety of techniques for providing tactile feedback in a surface or other keyboard that address one or more of these deficiencies of the prior art.

SUMMARY

Disclosed herein are four arrangements for providing tactility on a touch surface keyboard. One approach is to provide tactile feedback mechanisms, such as dots, bars, or other shapes on all or at least many keys. Different keys or groups of keys may have different feedback mechanisms, e.g., a first feedback mechanism may be assigned to "home row" keys, with a second feedback mechanism assigned to keys adjacent the home row, with a third assigned to peripheral keys, which are neither home row keys nor adjacent the home row. Alternatively, an articulating frame may be provided that extends when the surface is being used in a typing mode and retracts when the surface is used in some other mode, e.g., a pointing mode. The articulating frame may provide key edge ridges that define the boundaries of the key regions or may be used to provide tactile feedback mechanisms within the key regions. The articulating frame may also be configured to cause concave depressions similar to mechanical key caps in the surface. In another embodiment, a rigid, non-articulating frame may be provided beneath the surface. A user will then feel higher resistance when pressing away from the key centers, but will feel a softer resistance, which may be enhanced by filling the gaps with a foam or gel material or air.

Using these arrangements, as well as individual elements of each or combinations thereof, it is possible to provide strong tactile feedback of each key location without impeding pointing, gestures, or related lateral sliding motions on the same touch surface.

BRIEF DESCRIPTION OF THE DRAWINGS

The invention may best be understood by reference to the following description taken in conjunction with the accompanying drawings in which.

DETAILED DESCRIPTION

Braille-Like Dot Pairs or Bars at Key Centers

Figure 1:
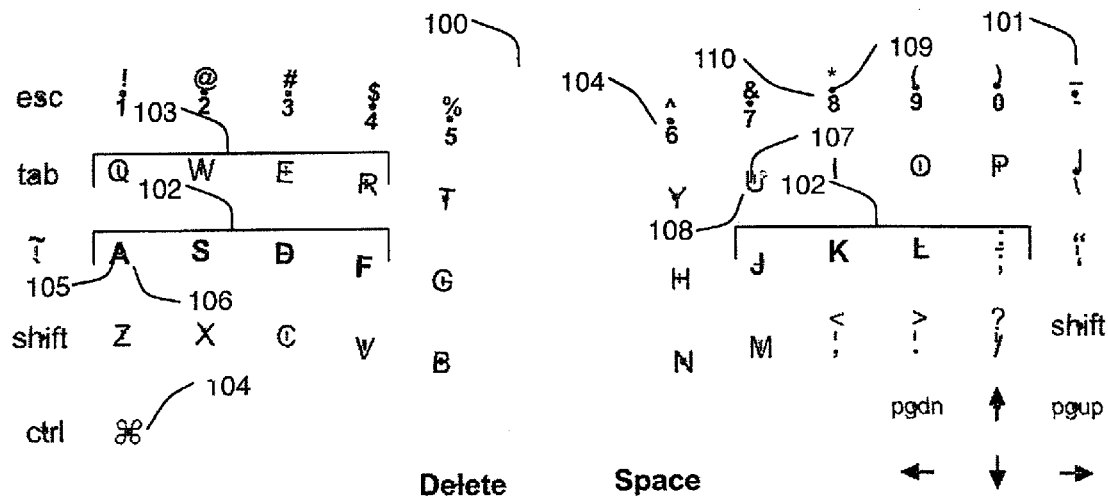
FIG. 1 is a top view of a surface keyboard employing a tactile feedback mechanism.
Figure 2:
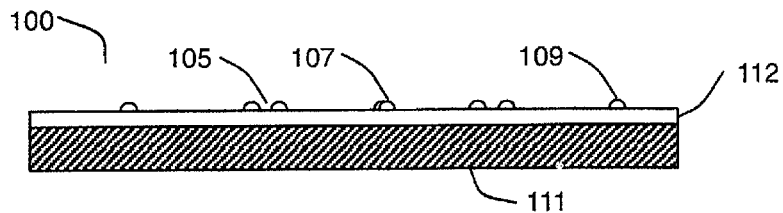
FIG. 2 is a cross-section view of the surface keyboard depicted in FIG. 1.

With reference now to FIGS. 1 and 2, one technique for providing tactile feedback in a surface keyboard is depicted. FIG. 1 is a vertical view of a surface keyboard 100. FIG. 2 is a cross-section view of surface keyboard 100. Surface keyboard 100 includes numerous key regions 101. As used herein, the term "key" may also refer to the key regions 101, although in a surface keyboard there is actually no mechanical key. Rather, sensing circuitry 111 disposed beneath the surface cover 112 detects an object, such as a user's finger, in contact or close proximity with the key regions 101 and outputs the corresponding letter, number, or symbol to a host computer or other device (not shown). The key layout shown in FIG. 1 is a slightly modified QWERTY layout, which has been ergonomically designed to provide a more comfortable typing position.

Key regions 101 are arranged in a plurality of rows. As known to touch typists, the row of keys containing the letters "ASDF" on the left-hand side and "JKL;" on the right-hand side are known as the home row 102. The home row is so called because a touch typist will keep the four fingers of each hand over these characters when a finger is not reaching for a key in another row. Adjacent rows 103 are the rows immediately adjacent, for example, the rows containing "QWER" and "ZXCV." The remaining rows are known as peripheral rows 104, for example, the row of number keys.

One mechanism to provide more robust tactile feedback for a user of a surface keyboard is to stamp two horizontally aligned dots 105 at the center of each home row key 106. Similarly, two vertically aligned dots 107 may be stamped on each adjacent key 108. Finally, a single dot 109 may be stamped on peripheral keys 110. Because the home row keys feel different than all other keys, home row 102 may be easily found without looking when sliding hands over the surface. The two vertical dots 107 on adjacent keys 108 in turn help distinguish their feel from peripheral number and punctuation keys having only one raised dot 110.

It will be appreciated that the particular arrangement of dots could vary from that described. For example, a single dot could be used to mark home row keys 102, with two horizontal dots used for adjacent keys 103 and two vertical dots used for peripheral keys 104. All that is required is that one unique tactile feedback mechanism, such as raised dots, be used for home row keys, while another is used for adjacent and/or peripheral keys. It is not required that the adjacent keys and peripheral keys employ different tactile feedback mechanisms, although it may be preferable to do so.

Figure 3:
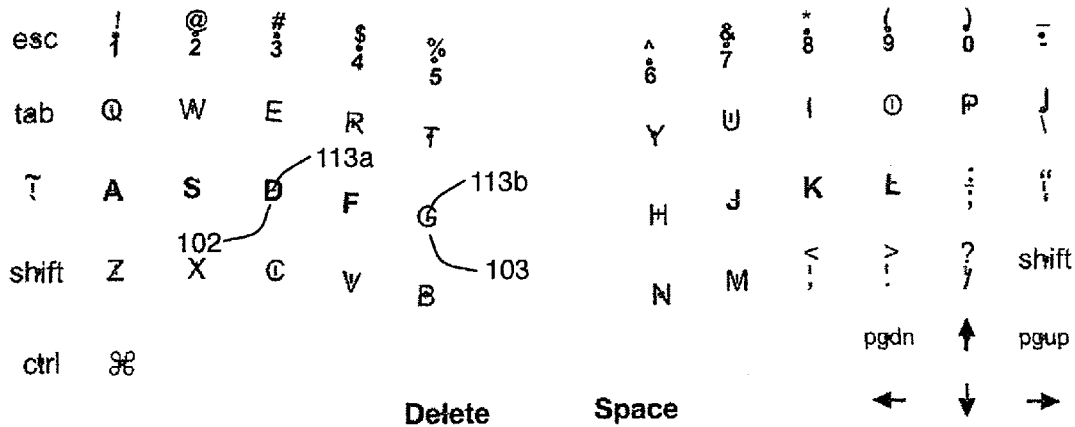
FIG. 3 is a top view of a surface keyboard employing a variation of the tactile feedback mechanism depicted in FIGS. 1 and 2.
Figure 4:
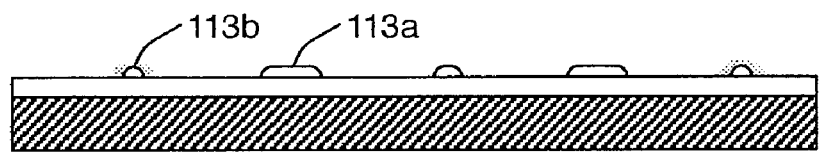
FIG. 4 is a cross-section view of the surface keyboard depicted in FIG. 3.

Moreover, the tactile feedback mechanism need not be limited to raised dots. In a variation of this technique, shown in plan-view in FIG. 3 and in cross-section in FIG. 4, the a raised dot pair is replaced with a raised "hyphen," i.e., a short bar 113. The short bars 113 may be, for example, arranged horizontally (113a) at the centers of home row keys 106 and vertically (113b) on keys adjacent to home row 102. Peripheral keys 110 may include a single raised dot 109. Other shapes, such as squares, circles, triangles, etc. could also be used so long as the arrangements used for home row keys 102 are distinct from those used for the adjacent keys 103 and/or peripheral keys 104. These embodiments may be less desirable than a raised dot pair in terms of efficient tactility and minimizing sensor distortion. However, these raised bars or other shapes may be more aesthetically pleasing than raised dot pairs.

It should also be noted that, although the tactile feedback arrangement described above has particular applicability to surface keyboards, it could also be used in conjunction with traditional mechanical/electromechanical keyboards. Additionally, although described in terms of the traditional QWERTY keyboard, the techniques may also be applied to other keyboard layouts, such as Dvorak keyboard, foreign language keyboards, court reporting machine keyboards, and other keyboard-like input devices.

Articulating Frame Protrudes at Key Edges During Typing

Figure 5:
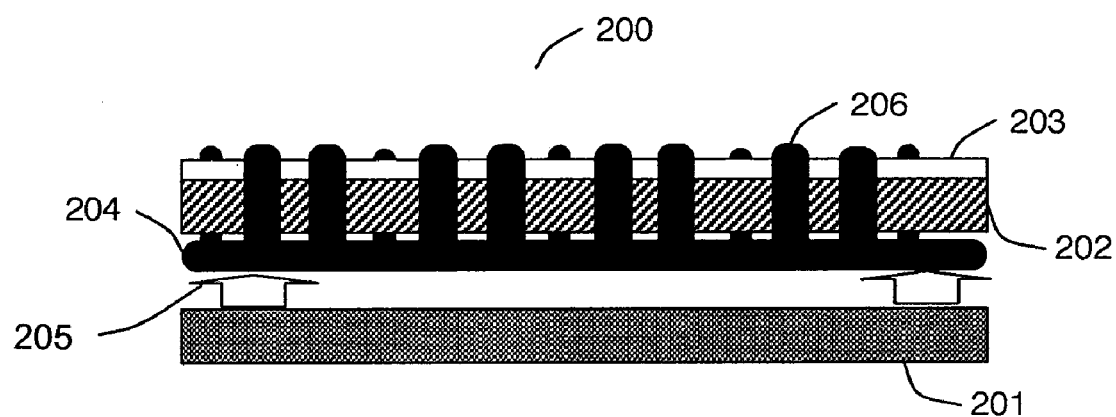
FIG. 5 is a cross-section view of a surface keyboard employing an alternative tactile feedback arrangement including an articulating frame (shown in an extended position).
Figure 6:
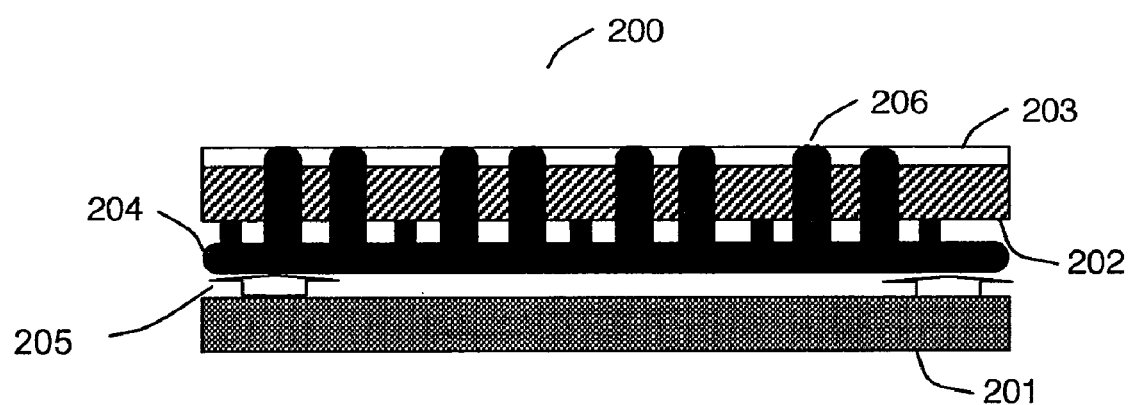
FIG. 6 is a cross-section view of the surface keyboard illustrated in FIG. 5 with the articulating frame shown in a retracted position.
Figure 7:
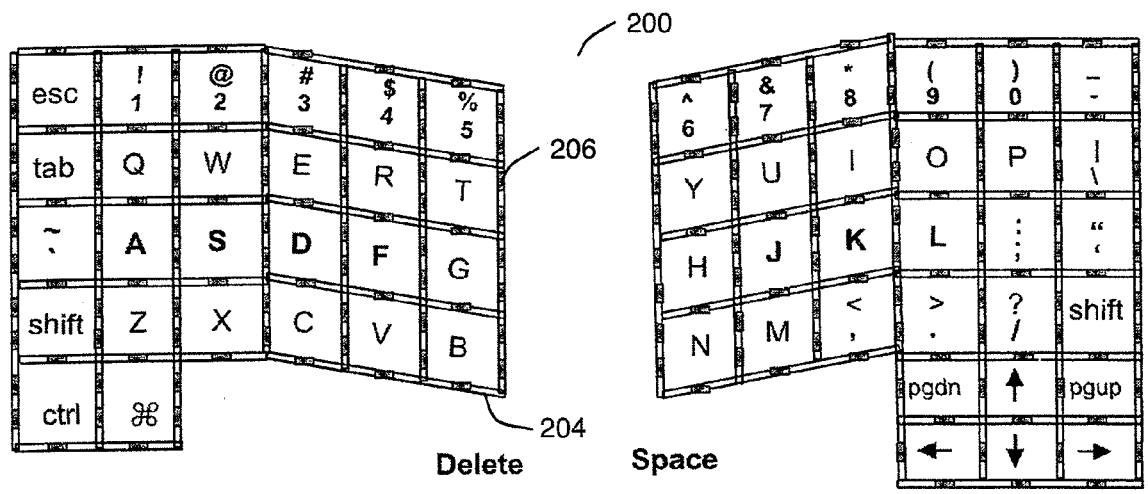
FIG. 7 is a plan view of the surface keyboard illustrated in FIGS. 5 and 6.

An alternative technique for providing tactile feedback in a surface keyboard will now be described with respect to FIGS. 5, 6, and 7. FIGS. 5 and 6 depict a cross-section view of the keyboard, while FIG. 7 depicts a plan view. As illustrated in FIGS. 5 and 6, the surface keyboard 200 comprises a plurality of layers including an enclosure base 201, the electrode circuit board 202, and the surface cover 203. Details of the construction of these devices are described in the various incorporated references and are not repeated here.

Additionally, the keyboard 200 includes an articulating frame 204, which is disposed beneath the circuit board 202. The articulating frame 204 may be raised and lowered by actuators 205, which preferably take the form of electromagnetic actuators. Raising and lowering the articulating frame extends and withdraws key edge ridges 206, which are dots or bars that poke through the keyboard surface when extended. Electromagnetic actuators 205 would raise the frame when operating in a typing mode such that the tops of the key edge ridges 206 are about 1 mm above the surface cover 203. The electromagnetic actuators 205 would lower the frame when operating in a pointing/gesture mode such that the tops of the key edge ridges 206 are flush with surface cover 203, thereby providing a substantially smooth surface for pointing and gesturing. Although electromagnetic actuators 205 are depicted as being disposed beneath the frame and above the enclosure bottom, they may be disposed in any arrangement that allows them to suitably displace the frame 204 and key edge ridges 206.

Preferably, each key edge comprises one to four distinct bars or Braille-like dots. When constructed in conjunction with a capacitive multi-touch surface, the key edge ridges should separated to accommodate the routing of the drive electrodes, which may take the form of rows, columns, or other configurations. As an alternative to key edge ridges 206, the frame could cause Braille-like dots or similar markers, as discussed above with respect to FIGS. 1-4 to protrude through the key centers, although this arrangement would potentially interfere with touch detection and measurement because it would require mechanical devices in proximity to the key center, which is a preferred sensor location. In yet another alternative arrangement, articulating frame 204 could be disposed above the electrode circuit board 202, although the added separation between the surface cover 203 and the circuit board 202 could complicate the touch measurement and detection.

The electromagnetic actuators may be located at the corners and/or center of the frame or distributed variously throughout the frame. Selection of a particular position will necessitate the determination of a variety of design parameters, such as frame material strength, power routing, cost, etc., all of which would be within the abilities of one skilled in the art having the benefit of this disclosure. The actuators 205 may be activated manually, for example, by touching the surface in a particular region, pressing a dedicated button, activating a switch, etc. Alternatively, the actuators raise and lower the frame according to mode commands from gesture and typing recognition software, such as that described in the '846 patent incorporated by reference above.

Specifically, the recognition software commands lowering of the frame when lateral sliding gestures or mouse clicking activity chords are detected on the surface. Alternatively, when homing chords (i.e., placing the fingers on the home row) or asynchronous touches (typing activity) is detected on the surface, the recognition software commands raising of the frame. Various combinations or subsets of these recognition techniques could also be used. For example, the device may activate a typing mode when homing chords or asynchronous touches are detected and deactivate the typing mode if neither is detected for a some time interval. In this configuration the device effectively defaults to a pointing mode and switches to a typing mode when necessary. Conversely, the device could activate a pointing mode when lateral sliding gestures or mouse clicking activity is detected and switch to a typing mode when these activities are not detected for some time interval. In any case, the frame will change modes automatically from lowered and flush (pointing mode) to poking through the surface (typing mode) as often as the operator switches between pointing and typing. Of course, operators who did not like the automated behavior could manually toggle the frame state with a pre-assigned gesture.

When extended, the key edge bars 206 provide similar tactile feel to a conventional mechanical key edge when the finger straddles two keys. However, this arrangement does not effectively simulate the concave depression common in mechanical keycaps, which helps a typists fingers sink towards the key center. Obviously, the key edge bars 206 will only be felt if fingers touch way off key center. Additionally, the holes in surface cover 203 through which the key edge bars 206 extend may collect dirt and grime. However, an extension of this arrangement may be used to address these concerns.

Articulating Frame Deforms Surface Cover at Key Edges During Typing

Figure 8A:
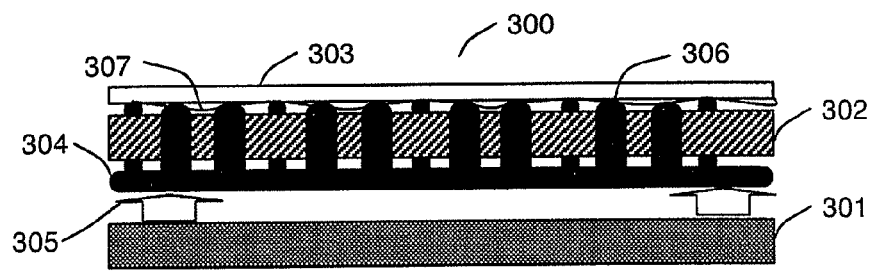
FIGS. 8A and 8B illustrate a cross-section view of a surface keyboard tactile feedback arrangement for simulating concave key cap centers.
Figure 8B:
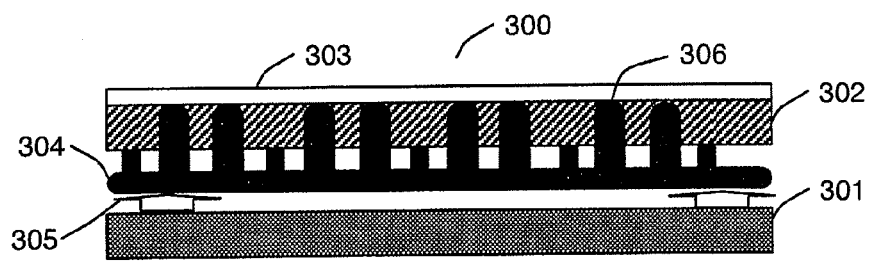

Illustrated in FIGS. 8A and 8B is a variation of the articulating frame arrangement discussed above with respect to FIGS. 5, 6, and 7. FIG. 8A shows the frame in the raised (typing) position, while FIG. 8B shows the frame in the lowered (pointing, gesturing, etc.) position. In this embodiment, the bars of articulating frame 304 protrude through the circuit board 302, but not through the surface cover 303. When actuators 305, disposed between enclosure base 301 and the articulating frame 304 raise frame 304, the bars 306 lift the surface cover 303, rather than poking through. By tacking the surface cover 303 to the circuit board 302 at the key centers, a concave keycap depression effect 307 will be created when the frame raises. This allows a users fingers to be guided toward the center of each key, much like a conventional keyboard. Additionally, because there are no holes in the surface cover 303, there is likely to be less accumulation of dirt and grime on the surface. Obviously, such an arrangement requires a more supple cover material than the rigid Lexan (polycarbonate) sheets often used as touchpad surfaces, but a variety of such materials are well known to those skilled in the art.

Rigid Frame Under Key Edges with Compressible Key Centers

Figure 9:
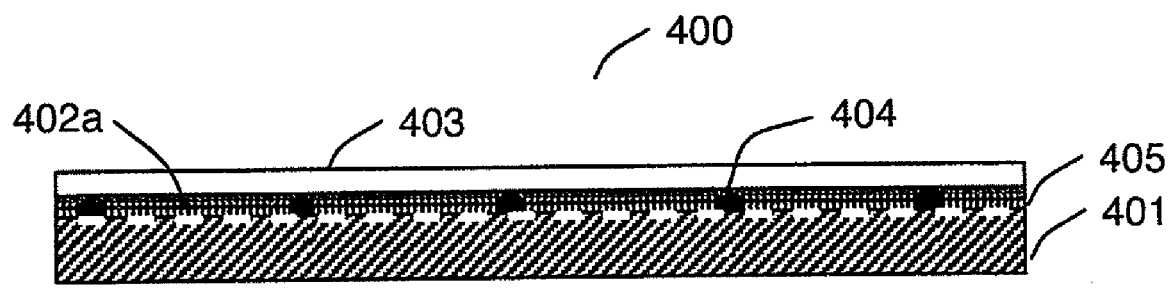
FIG. 9 illustrates a cross-section view of a surface keyboard employing a deformable material beneath the keys to provide tactile feedback.

Yet another embodiment may extends the covered key edge bars and key center depressions while dispensing with the mechanical complexity of frame articulation. Such an embodiment is illustrated in FIG. 9. The surface keyboard 400 comprises the familiar layers of an enclosure base (not shown), sensing circuit board 402 (with electrodes 402*a*), and surface cover 403. The surface cover sits atop a frame including a fixed network of hard key-edge ridges 404, which are preferably raised about 0.5-1 mm above the sensing circuit board 402. The gaps between the key edge ridges 404 are filled with a compliant gel or foam material 405 (or possibly even air) filling the key centers up to flush with the ridges.

This arrangement allows the surface cover 303 to drape substantially perfectly flat, and remain flat when under light pressure, e.g., that from a pointing or dragging operation. However, when a user presses a key center, the cover would give under their finger somewhat as the foam/gel/air material 405 is compressed, while a user pressing over a key edge would feel the hard ridge underneath. While this arrangement is electrically and mechanically simple (with no active mechanical parts), the surface cover and key filler materials must be chosen carefully to provide noticeable compression at key center yet be durable to wear. Additionally, the sandwich of surface cover and foam could become too thick for the capacitive sensors to properly detect through. To overcome these deficiencies, the surface cover 303 itself could contain flex circuitry (well known to those skilled in the art) imprinted with a suitable electrode pattern, which would dispense with the necessity of the electrode layer 402.

Many variations and/or combinations of the embodiments discussed herein will be apparent to those skilled in the art. For example, as noted above, the articulating frame may be combined with the Braille-like dots to form articulating Braille-like dots. Alternatively, the fixed Braille-like dots may be combined with the articulating ridges described with reference to FIG. 8 or with the compressible material of FIG. 9. It should also be noted that there are many alternative ways of implementing the methods and apparatuses of the present invention. It is therefore intended that the following appended claims be interpreted as including all such alterations, permutations, combinations and equivalents as fall within the true spirit and scope of the invention.

What is claimed is:

1. A touch sensitive surface configurable to operate as a keyboard, the touch sensitive surface comprising:
    a surface cover;
    a touch sensitive electrode circuit board disposed beneath the surface cover having a plurality of holes disposed therein;
    an articulating frame disposed beneath the touch sensitive electrode circuit board having integral therewith a plurality of key edge ridges aligned with the holes in the touch sensitive electrode circuit board; and at least one actuator disposed between the articulating frame and an enclosure of the touch sensitive surface and configured to displace the articulating frame so as to extend the key edge ridges through the holes in the touch sensitive electrode circuit board.

2. The touch sensitive surface of claim 1 wherein the surface cover includes a plurality of holes aligned with the holes in the circuit board and wherein the actuator is configured to displace the articulating frame so as to extend the key edge ridges through the holes in the surface cover.

3. The touch sensitive surface of claim 1 wherein the surface cover is attached to the touch sensitive electrode circuit board at a center of a key region such that extending the key edge ridges through the holes in the touch sensitive electrode circuit board forms a concave depression within the key region.

4. A touch sensitive surface according to claim 1 wherein the key edge ridges are extended when the device operates in a typing mode and retracted when the devices operates in a pointing mode.

5. A touch sensitive surface according to claim 2 wherein the key edge ridges are extended when the device operates in a typing mode and retracted when the devices operates in a pointing mode.

6. A touch sensitive surface according to claim 3 wherein the key edge ridges are extended when the device operates in a typing mode and retracted when the devices operates in a pointing mode.

7. The touch sensitive surface of claim 4 wherein switching between typing mode and pointing mode is accomplished manually.

8. The touch sensitive surface of claim 7 wherein manual switching is accomplished by at least one of: actuating a switch, pressing a button, touching the surface in a pre-defined region, and performing a pre-determined gesture.

9. The touch sensitive surface of claim 4 wherein switching between typing mode and pointing mode is accomplished automatically.

10. The touch sensitive surface of claim 9 wherein at least one of the following:

the typing mode is activated when asynchronous touches are detected;

the typing mode is deactivated when asynchronous touches are no longer detected;

the typing mode is activated when homing chords are detected;

the typing mode is deactivated when homing chords are no longer detected;

the pointing mode is activated when lateral sliding gestures are detected;

the pointing mode is deactivated when lateral sliding gestures are detected;

the pointing mode is activated when mouse clicking activity chords are detected; and the pointing mode is deactivated when mouse clicking activity chords are detected.

11. The touch sensitive surface of claim 4 wherein the key edge ridges comprise a plurality of distinct bars or dots.

12. The touch sensitive surface of claim 1 wherein the key edge ridges comprise tactile feedback mechanisms located at a center of one or more key regions.

13. The touch sensitive surface of claim 2 wherein the key edge ridges comprise tactile feedback mechanisms located at a center of one or more key regions.

14. The touch sensitive surface of claim 12 wherein the tactile feedback mechanisms are selected from the group consisting of: a single raised dot, two raised dots arranged horizontally, two raised dots arranged horizontally, a raised bar oriented horizontally, and a raised bar oriented vertically.

15. The touch sensitive surface of claim 12 wherein the tactile feedback mechanisms comprise:

a first tactile feedback mechanism for each home row key; and an additional tactile feedback mechanism distinct from the first tactile feedback mechanism for at least one key adjacent a home row key or at least one peripheral key.

16. The touch sensitive surface of claim 15 wherein the additional tactile feedback mechanism comprises:

a second tactile feedback mechanism for at least one key adjacent the home row keys; and a third tactile feedback mechanism for at least one peripheral key;

wherein the second and third tactile feedback mechanisms are distinct from each other.

17. The keyboard of claim 16 wherein:

the second feedback mechanism is provided for each key adjacent a home row key; and the third feedback mechanism is provided for each peripheral key.

* * * * *

UNITED STATES PATENT AND TRADEMARK OFFICE
CERTIFICATE OF CORRECTION

| | | |
|---|---|---|
| PATENT NO. | : 7,920,131 B2 | Page 1 of 1 |
| APPLICATION NO. | : 12/550280 | |
| DATED | : April 5, 2011 | |
| INVENTOR(S) | : Wayne Carl Westerman | |

It is certified that error appears in the above-identified patent and that said Letters Patent is hereby corrected as shown below:

On Page 3, in column 2, line 50, under "Other Publications", delete "G1idePoint" and insert -- GlidePoint --, therefor.

On Page 3, in column 2, line 53, under "Other Publications", delete "htm1" and insert -- html --, therefor In column 4, line 10, delete "the a" and insert -- the --, therefor.

In column 8, line 24, in Claim 14, delete "horizontally, a" and insert -- vertically, a --, therefor.

Signed and Sealed this
Twenty-ninth Day of November, 2011

David J. Kappos
*Director of the United States Patent and Trademark Office*